(12) United States Patent
Ting

(10) Patent No.: US 8,214,146 B2
(45) Date of Patent: Jul. 3, 2012

(54) ROUTE DATA COMPRESSION METHOD

(75) Inventor: Shih-Chieh Ting, Chung Ho (TW)

(73) Assignee: Globalsat Technology Corporation, Taipei Hsien (TW)

( * ) Notice: Subject to any disclaimer, the term of this patent is extended or adjusted under 35 U.S.C. 154(b) by 288 days.

(21) Appl. No.: 12/662,920

(22) Filed: May 12, 2010

(65) Prior Publication Data

US 2011/0282569 A1 Nov. 17, 2011

(51) Int. Cl.
*G01C 21/00* (2006.01)

(52) U.S. Cl. ............... 701/461; 701/467; 701/489

(58) Field of Classification Search ............... 701/461, 701/467, 489
See application file for complete search history.

(56) References Cited

U.S. PATENT DOCUMENTS

| | | | | |
|---|---|---|---|---|
| 6,650,996 B1 * | 11/2003 | Beesley et al. | ............ | 701/537 |
| 6,768,818 B2 * | 7/2004 | Friederich et al. | ............ | 382/233 |
| 6,782,318 B1 * | 8/2004 | Beesley et al. | ............ | 701/537 |
| 6,839,624 B1 * | 1/2005 | Beesley et al. | ............ | 701/468 |
| 7,034,839 B2 * | 4/2006 | Morishita | ............ | 345/555 |
| 7,340,341 B2 * | 3/2008 | Adachi | ............ | 701/461 |
| 7,382,370 B2 * | 6/2008 | Layne et al. | ............ | 345/428 |
| 7,574,291 B2 * | 8/2009 | Hsieh | ............ | 701/468 |

\* cited by examiner

*Primary Examiner* — David H Bollinger
(74) *Attorney, Agent, or Firm* — Bacon & Thomas, PLLC

(57) ABSTRACT

A route data compression method to compress the recording points of a line of a route planning data by means of setting the values of predetermined distance, predetermined angle and predetermined number of compression points and then determining whether or not the distance between every two recording points is greater than the predetermined distance and whether or not the contained angle of the two link lines of every three recording points is greater than the predetermined angle. After determination of all recording points, the recording points are compressed. If the number of points after compression is greater than the predetermined number of compression points, increase the value of the predetermined distance, and then repeat the determination procedure. When the number of points after compression becomes smaller than the predetermined number of compression points, the compression is done. Thus, the amount of storage data that records the route is greatly reduced, saving data storage space and enhancing data transmission speed.

6 Claims, 5 Drawing Sheets

ROUTE DATA COMPRESSION METHOD

BACKGROUND OF THE INVENTION

1. Field of the Invention

The present invention relates to route data processing technology and more specifically, to a route data compression method for compressing recording points for recording a route to reduce the amount of storage data by means of setting the values of predetermined distance, predetermined angle and predetermined number of compression points and then determining whether or not the distance between every two recording points is greater than the predetermined distance and whether or not the contained angle of the two link lines of every three recording points is greater than the predetermined angle.

2. Description of the Related Art

Following fast development of modern technology, many different electronic products are created to serve people, bringing more convenience to the people in their daily life. For example, many different advanced satellite navigation systems have been created following the development of satellite navigation technology. These advanced satellite navigation systems provide dramatic improvement in navigation quality, operation interface, display mode and size, attracting people to buy. Nowadays, most new cars are equipped with a satellite navigation system as a standard equipment. A satellite navigation system can receive a geographic coordinate data signal from an artificial satellite, compare the geographic coordinate data to its internal map database, and then display the location on a map. A satellite navigation system has a local area map database. When started the navigation software, the user can input the name or address of the destination, enabling the satellite navigation system to produce a line of route planning data. To a person who is not familiar with the road conditions, he or she can use the map of a satellite navigation system to guide the traveling to the destination.

However, the navigation mapping software programs of modern satellite navigation systems or electronic devices (desk computers, notebook computers, PDAs or servers) provide a 3D actual view simulation and different route planning modes, thereby increasing program capacity and complicating the computation procedure. In consequence, much data storage capacity is necessary for recording the data and a relatively higher operating power of central processing speed must be used, resulting in a rise in cost. Further, when the amount of storage data is increased, the data transmission speed will be lowered, leading to trouble.

Therefore, it is desirable to provide a method for use in the processing of route planning data to reduce memory space occupation, thereby eliminating the aforesaid problems.

SUMMARY OF THE INVENTION

The present invention has been accomplished under the circumstances in view. It is one object of the present invention to provide a route data compression method, which eliminates the drawbacks of conventional satellite navigation systems.

To achieve this and other objects of the present invention, a route data compression method is performed by means of setting the values of predetermined distance, predetermined angle and predetermined number of compression points, and then calculating the distance between every two recording points or the contained angle defined by two line segments of every three recording points and determining whether or not the distance calculated is greater than or equal to the value of the predetermined distance, and then determining whether or not the contained angle calculated is greater than or equal to the value of the predetermined angle. After determination of all recording points, the recording points are compressed. Thereafter, the number of points after compression is checked to be smaller or greater than the predetermined number of compression points. If the number of points after compression is greater than the predetermined number of compression points, increase the value of the predetermined distance, and then repeat the aforesaid determination procedure. When the number of points after compression becomes smaller than the predetermined number of compression points, the compression is done. Thus, the amount of storage data that records the route is greatly reduced, saving data storage space and enhancing data transmission speed.

DETAILED DESCRIPTION OF THE PREFERRED EMBODIMENT

Figure 1:
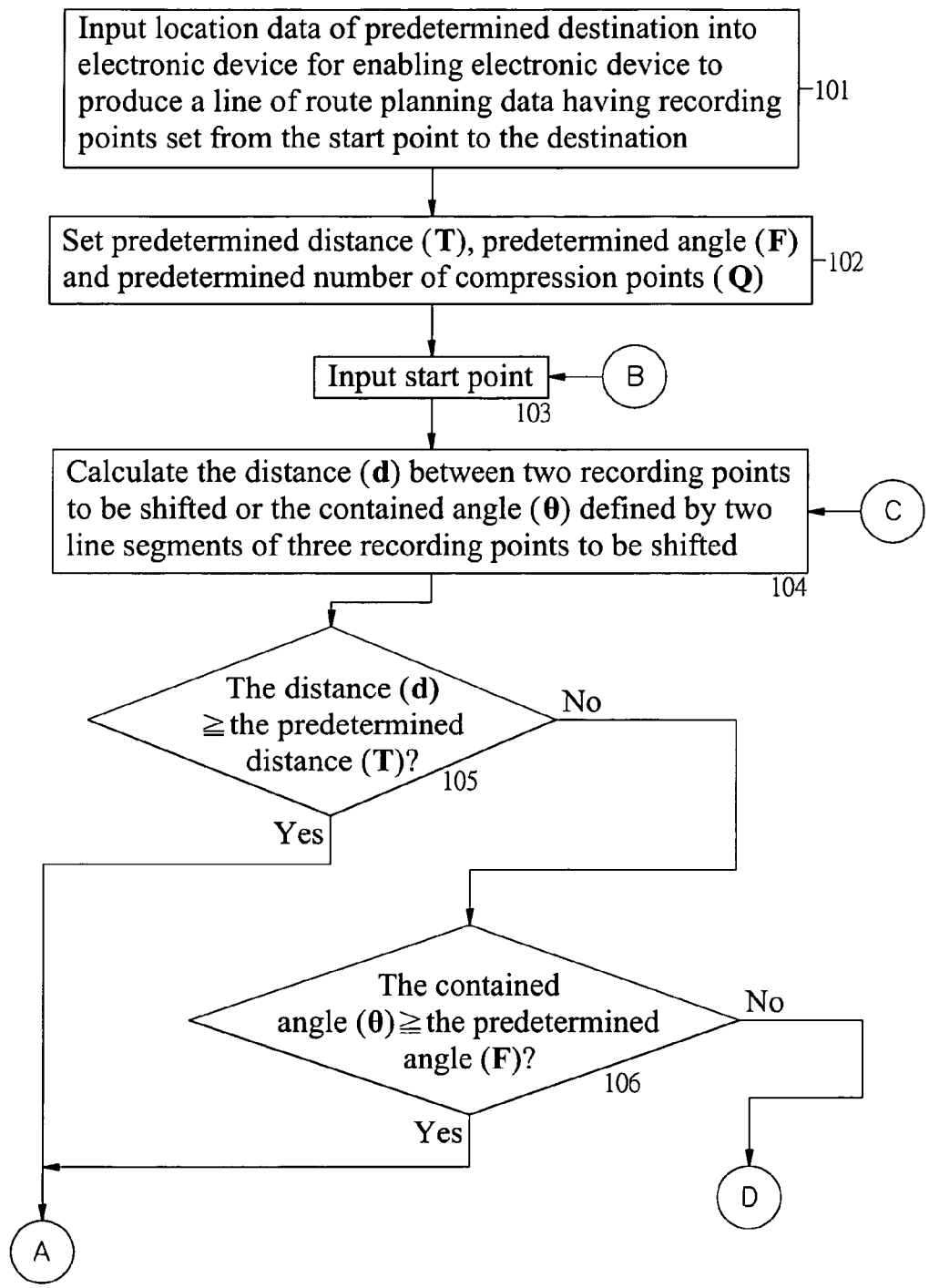
FIG. 1 is a flow chart of a route data compression method according to the present invention (I).
Figure 2:
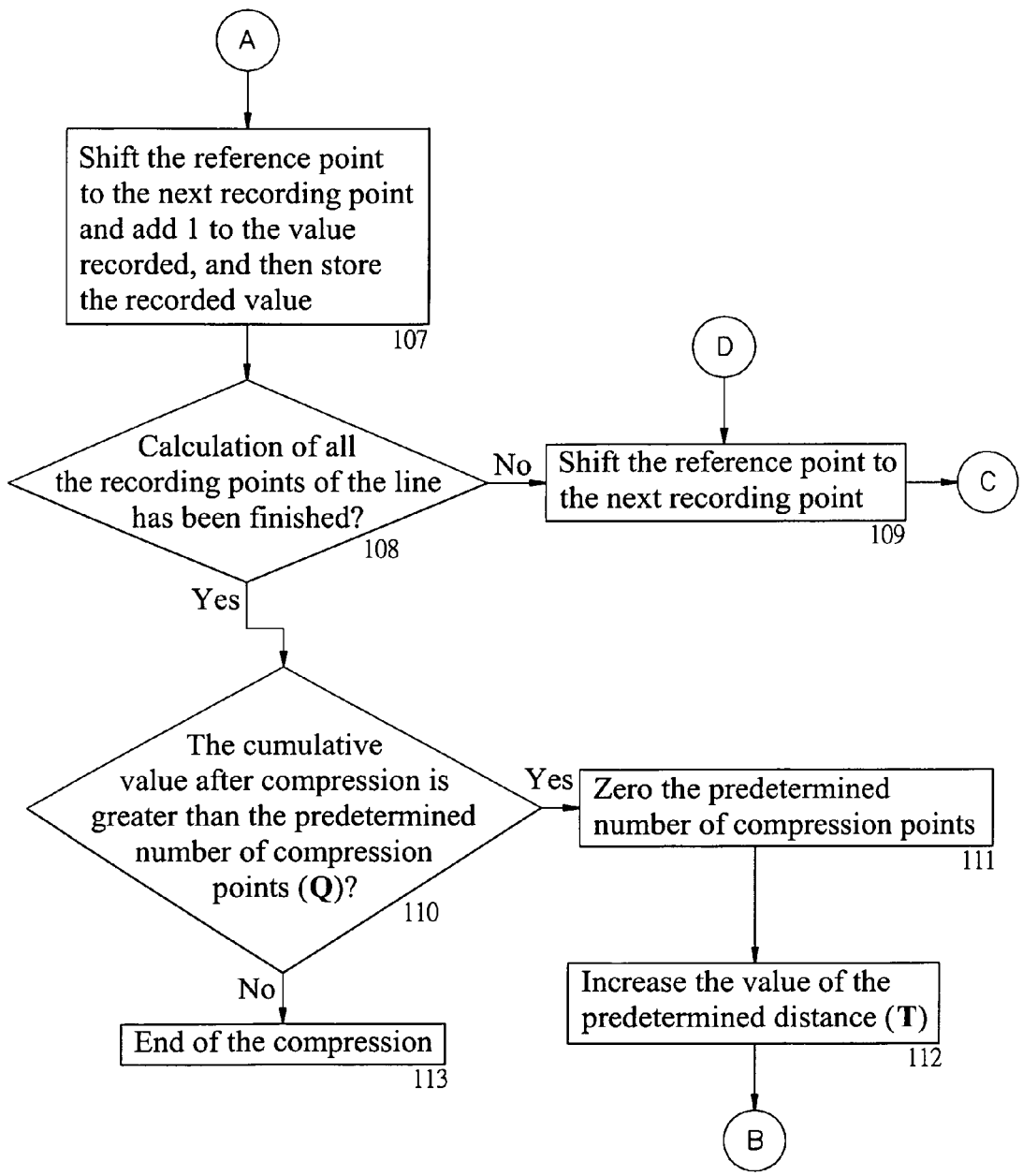
FIG. 2 is a flow chart of a route data compression method according to the present invention (II).
Figure 3:
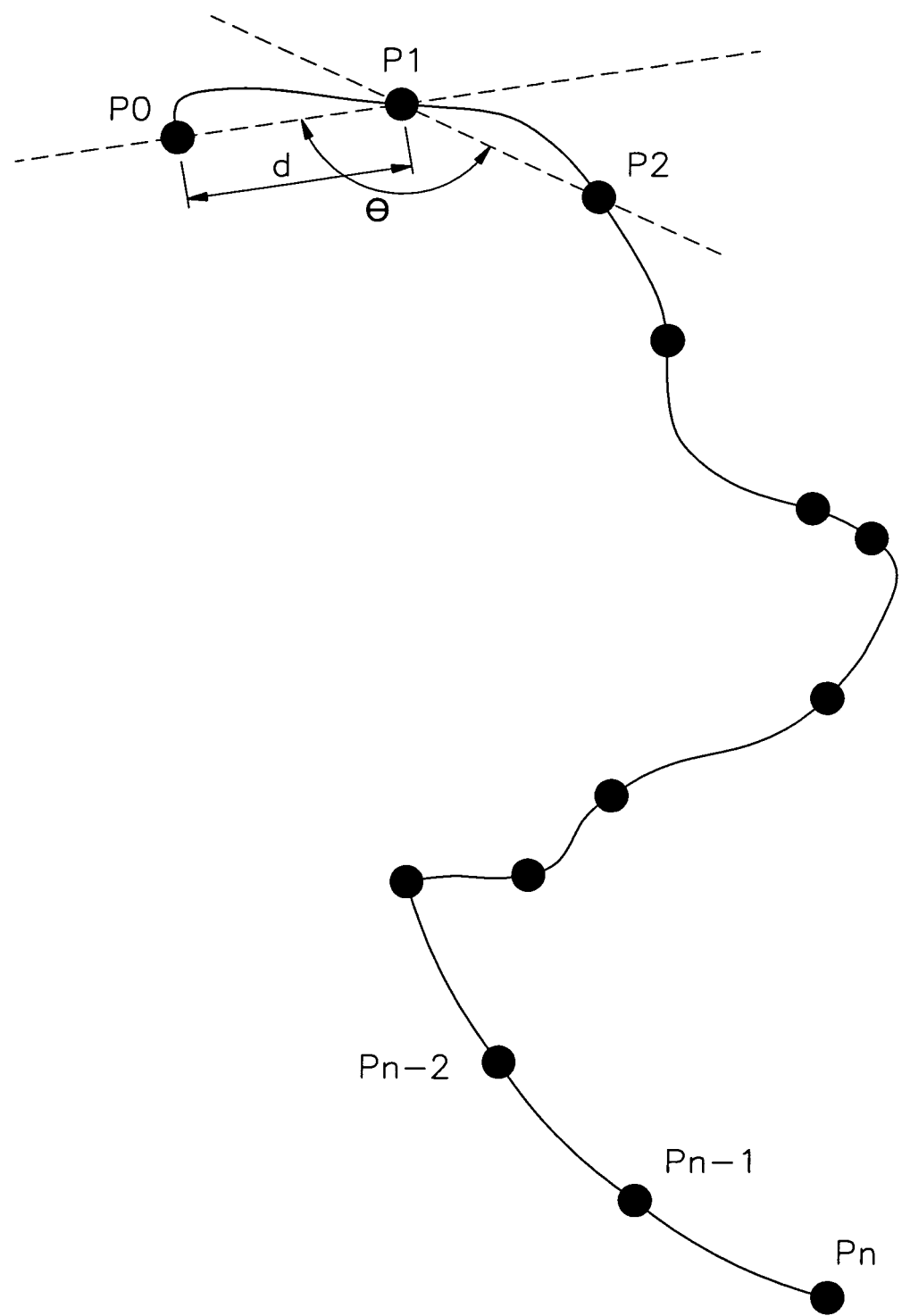
FIG. 3 is a schematic drawing, explaining the route data compression method according to the present invention.

Referring to FIGS. 1~3, a predetermined distance of a route (for example, 10 kilometers) is recorded by a predetermined number of recording points (for example, 100 recording points). An algorithm is employed to compress the recording points of the line of route planning data by means of using the link distance between two recording points to be shifted or the contained angle of the two link lines of three recording points to be shifted. This method is performed by means of inputting and storing the location data of the predetermined destination in an electronic device (such as desk computer, notebook computer, PDA or global navigation satellite system) at first, enabling the electronic device to produce a line of route planning data. Further, a GNS (global navigation satellite system) may be used to record the line of the route data the user traveled.

The user sets a predetermined distance (T) (T can be, for example, 10 meters or 100 meters), a predetermined angle (F) (F can be, for example, 120° or 130° but not equal to or greater than 180°) and a predetermined number of compression points (Q) (Q can be, for example, 50 points). A route planning data segment corresponds to one line (for example, 10 kilometers) that has a predetermined number of recording points (for example, 100 recording points). Assume the first recording point (P0) is the start point, a recording distance (d) will be produced when shifting the start point (P0) to the first next recording point (P1), a recording distance (d1) will be produced when shifting the first next recording point (P1) to the second next recording point (P2), a recording distance (d2) will be produced when shifting the second next recording point (P2) to the third next recording point (P3), and so on. At this time, the predetermined distance (T) is explained to have a length value when compared to the length of the recording distances (d, d1, d2, d3, d4 . . . dn).

When shifting a number of the aforesaid recording points (P1, P2, P3 . . . Pn), three recording points (for example, P0, P1, P2;P1, P2, P3; or P1, P3, P4) can be linked to form two line segments that define a recording angle (θ). At this time, the predetermined angle (F) is explained to have an angle value when compared to the angle of the recording angle (θ). Further, when the predetermined number of recording points (for example, 100 recording points) of the line of the aforesaid route planning data segment is compressed to, for example, 50 recording points, this value (50 recording points) becomes the predetermined number of compression points (Q).

The aforesaid route data compression method is performed subject to the following steps:

(101) Input the location data of the predetermined destination into an electronic device for enabling the electronic device to produce a line of route planning data that has a number of recording points set from the start point to the destination.

(102) Set a predetermined distance (T), a predetermined angle (F) and a predetermined number of compression points (Q) subject to said line of route planning data.

(103) Input the start point.

(104) Calculate the distance (d) between two recording points to be shifted or the contained angle (θ) defined by two line segments of three recording points to be shifted.

(105) Determine whether or not the distance (d) is greater than or equal to the value of the predetermined distance (T), and then proceed to step (107) when positive, or step (106) when negative.

(106) Determine whether or not the contained angle (θ) is greater than or equal to the value of the predetermined angle (F), and then proceed to step (107) when positive, or step (109) when negative.

(107) Shift the reference point to the next recording point and add 1 to the value recorded, and then store the recorded value.

(108) Determine whether or not the calculation of all the recording points of the line has been finished, and then proceed to step (110) when positive, or step (109) when negative.

(109) Return to step (104) and then shift the reference point to the next recording point, and then calculate the angle and distance again.

(110) Determine whether or not the cumulative value after compression is greater than the predetermined number of compression points (Q), and then proceed to step (111) when positive, or step (113) when negative.

(111) Zero the predetermined number of compression points (Q).

(112) Increase the value of the predetermined distance (T) and then return to step (103).

(113) End the compression.

As stated above, the location data of the predetermined destination is inputted into an electronic device for enabling the electronic device to produce a line of route planning data that has a number of recording points (for example, 100 recording points) set from the start point to the destination. Thereafter, set a predetermined distance (T) for comparison with the length between two recording points, a predetermined angle (F) for comparison with the contained angle between the two line segments of three recording points and a predetermined number of compression points (Q) by which a number of the recording points are to be compressed. Thereafter, input the start point, and then calculate the distance (d) between two recording points to be shifted or the contained angle (θ) defined by two line segments of three recording points to be shifted subject to expression d=dist (K[Z], P[n+1]) in which d is the recording distance.

Further, assume the first recording point (P0) is the start point, a recording distance (d) will be produced when shifting the start point (P0) to the first next recording point (P1), and another recording distance (d1) will be produced when shifting the first next recording point (P1) to the second next recording point (P2), and a contained angle will be produced between two straight lines subject to the expression:

$$\theta=\angle(\overline{K[Z],P[n+1]}, \overline{P[n+1],P[n+2]}),$$

Thereafter, determine whether or not the value of the recording distance (d) is greater than the value of the predetermined distance (T). If the value of recording distance (d) is not greater than the value of the predetermined distance (T), determine whether or not the value of the contained angle (θ) is greater than the value of the predetermined angle (F). If the value of the contained angle (θ) is not greater than the value of the predetermined angle (F), shift the front shifting point from the second recording point (P1) to the third recording point (P2), and then shift the rear shifting point from the third recording point (P2) to the fourth recording point (P3).

For example, the cumulative number of shifts (Z)=40 and the predetermined number of compression points (Q)=50, it means the recording points has been compressed from the original 100 points to 40 points. Because 40 points<50 points, the number of points after compression is smaller than the predetermined number of compression points (Q), and the procedure is done. If the cumulative number of shifts (Z)=60 and the predetermined number of compression points (Q)=50, the number of points after compression is greater than the predetermined number of compression points (Q), the setting must be done again, and the value of the predetermined distance (T) must be increased so that the aforesaid procedure can be performed again till that the value of the cumulative number of shifts (Z) become smaller than the predetermined number of compression points (Q).

Figure 4:
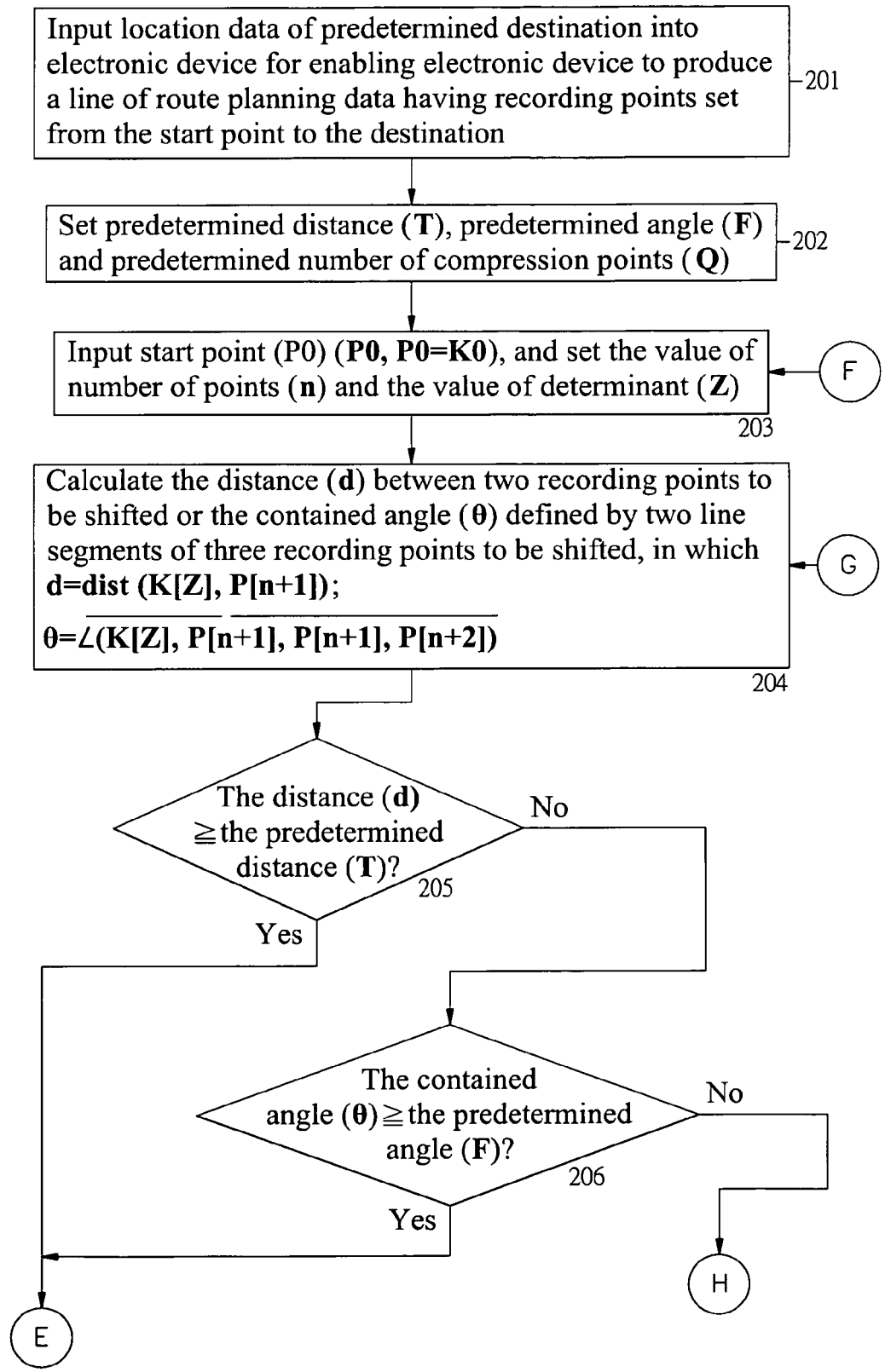
FIG. 4 is a flow chart of an example of the route data compression method according to the present invention (I).
Figure 5:
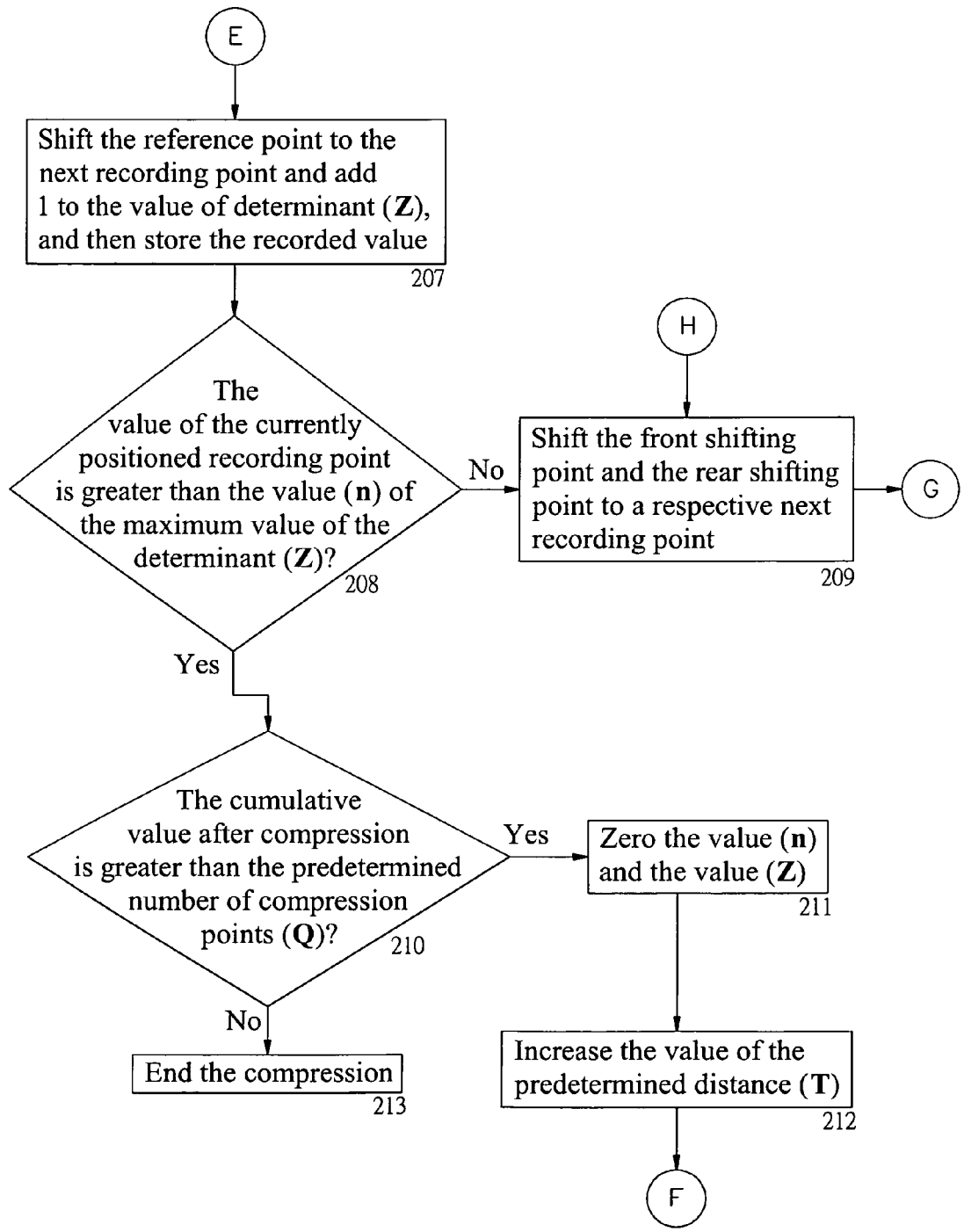
FIG. 5 is a flow chart of an example of the route data compression method according to the present invention (II).

Referring to FIGS. 3~5, in an example of the present invention, the route data compression method is performed subject to the following steps:

(201) Input the location data of the predetermined destination into an electronic device for enabling the electronic device to produce a line of route planning data that has a number of recording points set from the start point to the destination.

(202) Set a predetermined distance (T=100), a predetermined angle (F=120°) and a predetermined number of compression points (Q=50) subject to said line of route planning data.

(203) Input the start point (P0, P0=K0), and set the value of number of points (n) (n=0~400) and the value of determinant (Z) (Z=0~100).

(204) Calculate the distance (d) between two recording points to be shifted or the contained angle (θ) defined by two line segments of three recording points to be shifted, in which:

$$d=\text{dist}(K[Z],P[n+1]);$$

$$\theta=\angle(\overline{K[Z],P[n+1]}, \overline{P[n+1],P[n+2]}).$$

(205) Determine whether or not the distance (d) is greater than or equal to the value of the predetermined distance (T), and then proceed to step (207) when positive, or step (206) when negative.

(206) Determine whether or not the contained angle (θ) is greater than or equal to the value of the predetermined angle (F), and then proceed to step (207) when positive, or step (209) when negative.

(207) Shift the reference point to the next recording point and add 1 to the value of determinant (Z), and then store the recorded value (Z++, P[n+1]=K[Z]).

(208) Determine whether or not the value of the currently positioned recording point is greater than the value (n) of the maximum value of the determinant (Z), and then proceed to step (210) when positive, or step (209) when negative.

(209) Return to step (204) and then shift to the next recording point, and then calculate the angle and distance again.

(210) Determine whether or not the cumulative value after compression is greater than the predetermined number of compression points (Q), and then proceed to step (211) when positive, or step (213) when negative.

(211) Zero the value (n) and the value (Z).

(212) Increase the value of the predetermined distance (T) and then return to step (203).

(213) End the compression.

Thus, the location data of the predetermined destination is inputted into an electronic device for enabling the electronic device to produce a line of route planning data that has a number of recording points (for example, 100 recording points) set from the start point to the destination. Thereafter, set a predetermined distance (T) for comparison with the length between two recording points, a predetermined angle (F) for comparison with the contained angle between the two line segments of three recording points and a predetermined number of compression points (Q) by which a number of the recording points are to be compressed.

Thereafter, input the start point (P0 in which. P0=K0) and set the value (n) and the value (Z), and then calculate the distance (d) between two recording points to be shifted or the contained angle (θ) defined by two line segments of three recording points to be shifted. This calculation is made subject to expression d=dist (K[Z], P[n+1]) in which d is the recording distance; K[Z] is the reference point; P[n+1] is the n+1 recording point; the n+1 recording point is the last shifting point Assume the initial reference point is first recording point (P0) and P[n+1] is the n+1 recording point (P1), a recording distance (d) will be produced from the reference point (P0) to the n+1 recording point (P1), and another recording distance (d1) will be produced when shifting the recording point (P1) to the next recording point (P2); when the reference point is shifted from the recording point (P0) to the recording point (P1), another recording distance (d2) will be produced between the recording point (P0) and the recording point (P1). At this time, the predetermined distance (T) can be expressed by a length value that shows a ratio elative to the recording distances (d, d1, d2 . . . dn).

Further, a straight line is formed between the reference point (K[Z]=K[0]) and the front shifting point (P[n+1]=P[1]), and (P[n+2]=P[2]) becomes the rear shifting point, and another straight line is produced between the front shifting point (P[n+1]=P[1]) and the rear shifting point (P[n+2]=P[2]), and therefore these two straight lines define a contained angle (θ) subject to the expression:

$$\theta = \angle \overline{(K[Z], P[n+1], P[n+1], P[n+2])}.$$

Thereafter, determine whether or not the value of the recording distance (d) is greater than the value of the predetermined distance (T). If the value of recording distance (d) is not greater than the value of the predetermined distance (T), determine whether or not the value of the contained angle (θ) is greater than the value of the predetermined angle (F). If the value of the contained angle (θ) is not greater than the value of the predetermined angle (F), shift the front shifting point from the second recording point (P1) to the third recording point (P2), and then shift the rear shifting point from the third recording point (P2) to the fourth recording point (P3), i.e. add 1 to (n) in the recording distance (d) and the contained angle (θ) of the expression. For example, when the value of n=0, thus, d=dist (K[Z], P[1]), and $$\theta = \angle \overline{(K[Z], P[n+1], P[n+1], P[n+2])};$$

when add 1 to the value of n=0, the value of n become 1, thus, d=dist (K[1], P121), and $$\theta = \angle \overline{(K[Z], P[2], P[2], P[3])}.$$

Thus, when the value of the recording distance (d) is equal to or greater than the value of the predetermined distance (T) or the value of the contained angle (θ) is greater than or equal to the value of the predetermined angle (F), shift the reference point from the first recording point (P0) to the second recording point (P1) and add 1 to the Z determinant, and then determine whether or not the rear moving point has reached the last recording point (for example, the 100$^{th}$ recording point. If the line has 100 recording points, the last recording point is the 100$^{th}$ recording point. When reached the 100$^{th}$ recording point, it means all the recording points have been determined. If the determination shows negative, shift the front moving point from the second recording point to the third recording point and the rear moving point from the third recording point to the fourth recording point, i.e., add 1 to n in the recording distance (d) and contained angle (θ) of the expression. If all the recording points have been determined, determine whether or not the compressed value is greater than the value of compression points (Q).

For example, when the cumulative number of shifts (Z)=40 and the predetermined number of compression points (Q)=50, it means the recording points has been compressed from the original 100 points into 40 points. Because 40 points<50 points, the number of points after compression is smaller than the predetermined number of compression points (Q), and the procedure is done. If the cumulative number of shifts (Z)=60 and the predetermined number of compression points (Q)=50, the number of points after compression is greater than the predetermined number of compression points (Q), the number of points compressed does not reach the predetermined number of compression points (Q), thus the value of the determinant Z must be cleared to zero the value of the determinant n, and then put in the equation:

$$d = dist(K[Z], P[n+1]) \text{ or }$$

$$\Theta = \angle \overline{(K[Z]^*P[1], P[1]^*P[2])},$$

to return the reference point and the front moving point to the first recording point (P0) and the second recording point (Q) respectively, and then increase the length value of the predetermined distance (T), and then repeat the aforesaid procedure till that (Z) value becomes smaller than (Q) value. When (Z) value becomes smaller than (Q) value, it means the number of points compressed surpasses the predetermined number of compression points (Q), and the procedure is finished. This compression method reduces data storage amount and saves memory space, facilitating data access and accelerating data transmission speed.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A route data compression method to be employed to compress recording points for recording the line of a route planning data by means of using the link distance between two said recording points or the contained angle of the two link lines of three said recording points, the route data compression method comprising the steps of:

(A) Input the location data of the predetermined destination into an electronic device for enabling the electronic device to produce a line of route planning data that has a number of recording points set from the start point to the destination, (B) Set a predetermined distance (T), a predetermined angle (F) and a predetermined number of compression points (Q) subject to said line of route planning data, (C) Input the start point, (D) Calculate the distance (d) between two said recording points to be shifted or the contained angle (θ) defined by two line segments of three said recording points to be shifted, (E) Determine whether or not the distance (d) is greater than or equal to the value of the predetermined distance (T), and then proceed to step (G) when positive, or step (F) when negative, (F) Determine whether or not the contained angle (θ) is greater than or equal to the value of the predetermined angle (F), and then proceed to step (G) when positive, or step (I) when negative, (G) Shift the reference point to the next recording point and add 1 to the value recorded, and then store the recorded value, (H) Determine whether or not the calculation of all the recording points of the line has been finished, and then proceed to step (J) when positive, or step (I) when negative, (I) Return to step (D) and then shift the reference point to the next recording point, and then calculate the angle and distance again, (J) Determine whether or not the cumulative value after compression is greater than the predetermined number of compression points (Q), and then proceed to step (K) when positive, or step (M) when negative, (K) Zero the predetermined number of compression points (Q), (L) Increase the value of the predetermined distance (T) and then return to step (C), (M) End the compression.

2. The route data compression method as claimed in claim 1, wherein the predetermined distance (T) set in step (B) is 10 meters.

3. The route data compression method as claimed in claim 1, wherein the predetermined distance (T) set in step (B) is 100 meters.

4. The route data compression method as claimed in claim 1, wherein the predetermined angle (F) set in step (B) is smaller than 180°.

5. The route data compression method as claimed in claim 1, wherein the predetermined angle (F) set in step (B) is within 120°~130°.

6. The route data compression method as claimed in claim 1, wherein the predetermined number of compression points (Q) set in step (B) is 50.

* * * * *